US006915109B2

(12) United States Patent
Wouters et al.

(10) Patent No.: US 6,915,109 B2
(45) Date of Patent: Jul. 5, 2005

(54) METHOD OF OPERATING A REMOTE CONTROL SYSTEM AND A REMOTE CONTROL SYSTEM COMPRISING AN RF TRANSMISSION AND RECEIVING SYSTEM

(75) Inventors: Johan Agnes Emile Wouters, Leuven (BE); Robert Edmond Victor A. Nickson, Leuven (BE); Marc Emiel Celine Lambrechts, Kessel-Lo (BE); Chookhoon Phuah, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 465 days.

(21) Appl. No.: 10/262,806

(22) Filed: Oct. 2, 2002

(65) Prior Publication Data

US 2003/0087616 A1 May 8, 2003

(30) Foreign Application Priority Data

Oct. 5, 2001 (EP) .............................................. 01203758

(51) Int. Cl.$^7$ .............................. H04B 1/00; H04B 7/00
(52) U.S. Cl. ........................... 455/45; 455/93; 455/142; 455/352
(58) Field of Search ........................... 455/39, 41.1, 45, 455/74, 93, 142, 352; 341/176; 340/825.72

(56) References Cited

U.S. PATENT DOCUMENTS

| 5,636,264 A | * | 6/1997 | Sulavuori et al. ............. 398/41 |
| 5,815,108 A | * | 9/1998 | Terk ........................... 341/176 |
| 2004/0162108 A1 | * | 8/2004 | Fu et al. ..................... 455/557 |

* cited by examiner

Primary Examiner—Nguyen T. Vo
(74) Attorney, Agent, or Firm—Edward W. Goodman

(57) ABSTRACT

In a method of operating a remote control system and in such a system comprising an RF transmission and receiving system and an IR transmission device the sub-carrier information of the IR signal is transmitted in the RF signal in a signal separate from the envelope information of the IR signal which is contained in a envelope signal.

11 Claims, 5 Drawing Sheets

METHOD OF OPERATING A REMOTE CONTROL SYSTEM AND A REMOTE CONTROL SYSTEM COMPRISING AN RF TRANSMISSION AND RECEIVING SYSTEM

FIELD OF THE INVENTION

The invention relates to a method of operating a remote control system comprising an RF transmission and receiving system which comprises a radio transmitter for transmitting an RF signal and a radio receiver for receiving the RF signal transmitted by the radio transmitter, said receiver being coupled to an infrared transmitter for transmitting an IR signal on an IR sub-carrier in response to the receipt of said RF signal.

The invention also relates to a remote control system comprising an RF transmission and receiving system which comprises a radio transmitter for transmitting an RF signal and a radio receiver for receiving an RF signal transmitted by the radio receiver coupled to an infrared transmitter for transmitting an IR signal on an IR sub-carrier in response to the receipt of said RF signal.

The invention may be used in a variety of systems and devices inter alia, but not restricted to, systems comprising or using remote control, VCR, TV, Internet-enabled TV, Set-top boxes, PC-TV, PC, home control.

BACKGROUND OF THE INVENTION

A method and system in accordance with the first two paragraphs is known for instance from GB-A-2,217,544. Furthermore, IR-RF and RF-IR converters for transmitting IR codes to legacy devices (e.g. VCR, STB) that are located on places isolated from IR light (e.g. behind walls, in closets etc.) are available on the market.

The existing systems, however, are not well equipped to handle a wide range of IR sub-carrier frequencies and because the IR signal can have various coding schemes the IR signal is not always easily recovered from the transmitted RF (radio frequency) signal. Also for high frequencies low-cost RF transmission is impossible or at least hard to obtain.

SUMMARY OF THE INVENTION

It is an object of the invention to provide a method and system with which, in a relatively simple and cost effective manner the IR signal is more readily retrievable from the transmitted RF signal.

To this end the method in accordance with the invention is characterized in that the RF signal as sent comprises an envelope signal containing information on the envelope of the IR signal and a sub-carrier signal separate from the envelope signal containing information about the sub-carrier of the IR signal.

Preferably the information about the sub-carrier is sent as a header message in front of the envelope.

The system in accordance with the invention is characterized in that the RF transmission and receiving system comprises means for providing the RF signal with an envelope signal containing information on the envelope of the IR signal and a sub-carrier signal separate from the envelope signal containing information about the sub-carrier of the IR signal.

The known method and system utilize a direct conversion of the IR signal to an RF signal and vice versa. This means that the RF envelope is switched at the IR sub-carrier frequency.

Because in general the IR sub-carrier can vary from 20 to 100 kHz, the RF transmitter and receiver must be wideband. Disadvantages of wideband RF are:

reduced sensitivity,
poor noise resistance.

These disadvantages in conjugation with the problem that the IR signal can have various coding schemes makes it difficult to recover the IR signal from the transmitted RF signal.

An extra problem occurs with IR codes that use even higher sub-carrier frequencies than 100 kHz (499 kHz, 1 MHz, . . . as used by certain manufacturers). For these frequencies it is impossible to make a low-cost RF transmission.

To overcome these problems in the present invention the IR sub-carrier is removed from the IR message leaving only the envelope of the IR message. The information about the sub-carrier is put in an extra RF message that is e.g. sent as a kind of header message in front of the original message. The RF signal, containing both the header and the original message (envelope), are modulated on a fixed frequency (sub-carrier) that allows an easy modulation of the RF carrier and easy recovery from the transmitted RF signal on the RF receiver side. The two messages, header (carrier information) and data (envelope), are brought together again on the RF receiver side to reconstruct the original IR message.

The invention further allows the optimization of the RF link and it allows the transmission of IR codes (via the R-F link) with virtually any possible carrier frequency.

The invention may be embodied in several methods and systems.

In a first embodiment the system comprises and the method makes use of an infrared remote control unit for transmitting an IR signal on an IR sub-carrier to the RF transmission and receiving system, and the RF transmission and receiving system comprises an infrared receiver coupled to the radio transmitter for transmitting the RF signal in response to the IR signal sent by the infrared remote control unit.

In this embodiment the original signal is constituted by an IR signal transmitted by an IR remote control unit which is detected by the infrared receiver coupled to the RF transmission and receiver unit which converts the original IR signal into an RF signal comprising an envelope signal and a separate sub-carrier signal. Such systems allow the use of already existing IR remote control units.

However, within the framework of the invention it is also possible (and this is the subject of a preferred embodiment) that rather than beginning with an original IR signal from a remote control IR unit, immediately RF signals are used. In such systems and methods the remote control unit sends directly an RF signal comprising an envelope signal and a separate sub-carrier signal. These envelope and sub-carrier signals are then decoded at the receiving end decoded. Such systems are simpler. In a most preferred embodiment the remote control unit comprises means for transmitting an IR signal as well as an RF signal in accordance with the invention. Such remote control units are then universally applicable.

These and other aspects of the invention are apparent from and will be elucidated with reference to the embodiment(s) described hereinafter with reference to the accompanying drawings.

BRIEF DESCRIPTION OF THE DRAWINGS

In the drawings.

The Figures are not drawn to scale. Generally, like components are denoted by the like reference numerals in the Figures.

DETAILED DESCRIPTION OF PREFERRED EMBODIMENTS

Figure 1:
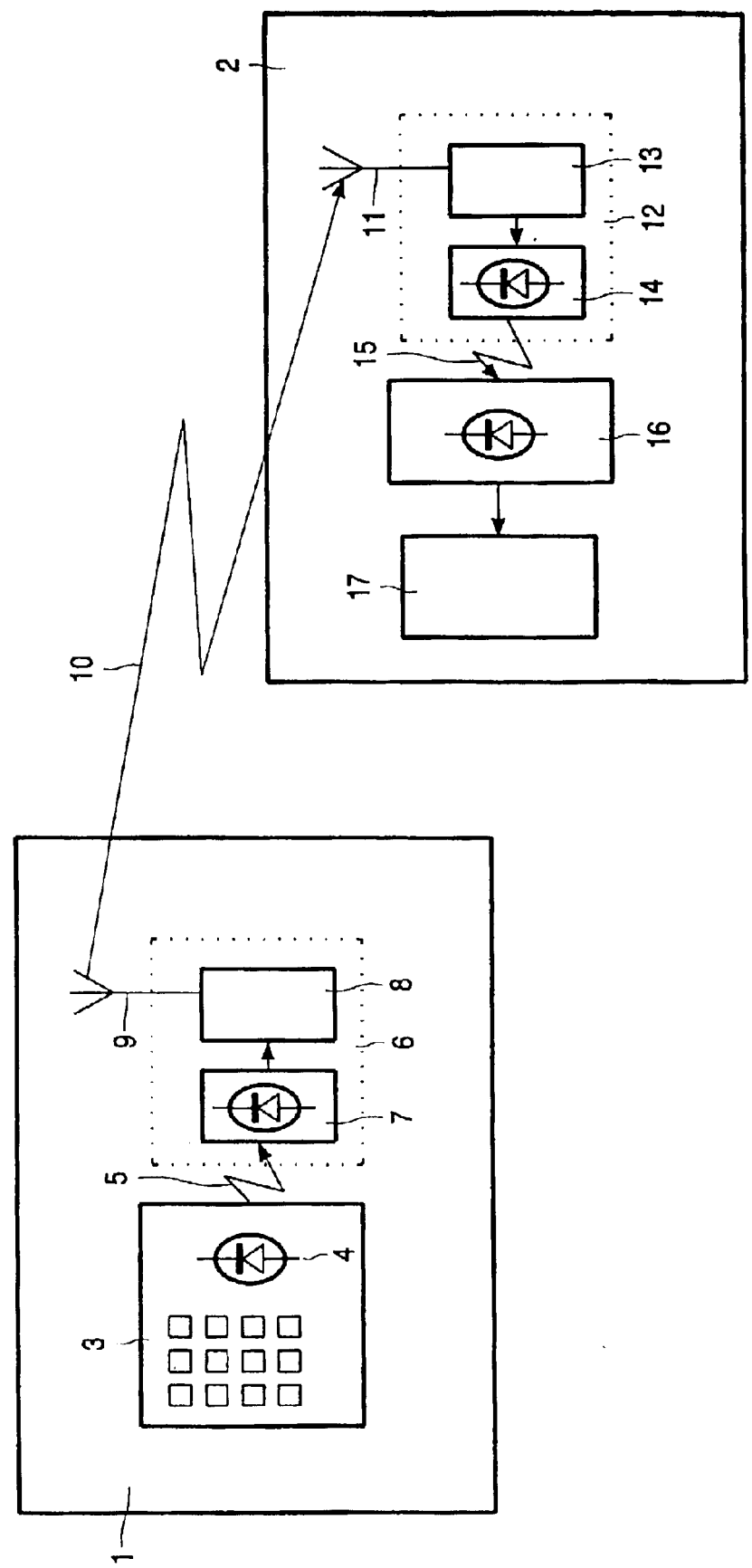
FIG. 1 schematically illustrates an embodiment of types of systems and methods of the invention, FIG. 2 schematically illustrates the known method, FIG. 3 schematically illustrates the method in accordance with the invention, FIG. 4 schematically shows a detail of a system in accordance with the invention, FIG. 5 schematically shows a detail of a system in accordance with the invention, FIGS. 6 and 7 schematically illustrate further embodiments of types of systems and methods of the invention.

FIG. 1 schematically illustrates an embodiment of the method and systems of the invention in which the range of an infrared remote control system is extended. In a room 1 and a separate room 2 the following elements are present. An infrared remote control unit 3 comprises an infrared transmitter 4 for transmitting an IR signal 5 on an IR sub-carrier, an RF transmission system 6 comprises an infrared receiver 7 coupled to a radio transmitter 8 for transmitting a radio signal 10 (in this example via antenna 9) in response to a infrared signal 5.

The radio signal 10 is received via antenna 11 by radio receiver 13, which is coupled to IR transmitter 14 for generating IR signal 15. This is received by IR receiver 16 which is coupled to a device to be controlled such as an VCR.

Figure 2:
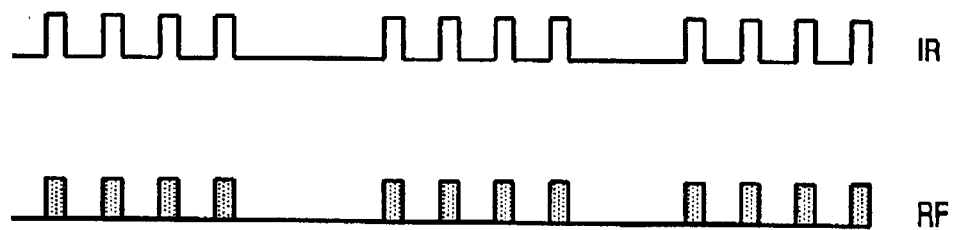

FIG. 2 schematically illustrates a feature of the method and system known so far. All existing converters do a direct conversion of the IR signal to an R-F signal and vice versa. This means that the RF envelope is switched at the IR sub-carrier frequency, that can vary from 20 to 100 kHz in standard remote controls. The top signal schematically indicates the IR signal, the bottom signal the RF signal wherein the gray zone in the RF signal represents the RF carrier.

Because in general the IR sub-carrier can vary from 20 to 100 kHz, the RF transmitter and receiver must be wideband. Disadvantages of wideband RF are:
reduced sensitivity,
poor noise resistance.

These disadvantages together with the problem that the IR signal can have various coding schemes makes it difficult to recover the IR signal from the transmitted RF signal.

An extra problem occurs with IR codes that use even higher sub-carrier frequencies than 100 kHz (499 kHz, 1 MHz, . . . as used by certain manufacturers). For these frequencies it is impossible to make a low-cost RF transmission.

Figure 3:
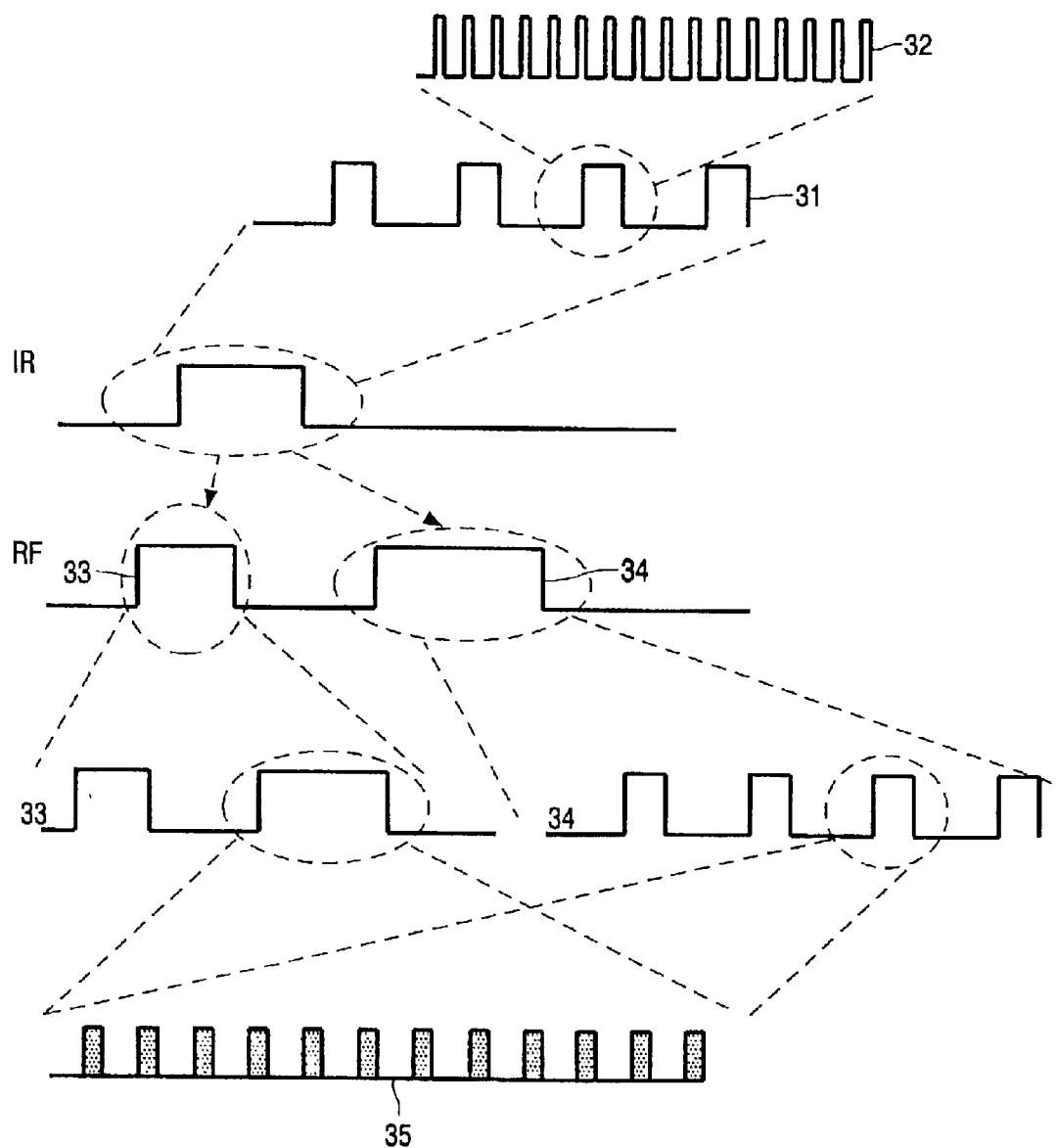

FIG. 3 schematically illustrates the method and aspects of the system in accordance with the invention. To overcome the above-mentioned problem the IR sub-carrier 32 is removed from the original IR message leaving only the envelope 31 of the original IR message. The information about the sub-carrier 32 is put in an extra RF message 33 that is sent as a separate message e.g. a kind of header message in front of envelop 34 of the original message.

The RF signal (as indicated in the Figure), containing both the header 33 and the original message (envelope 34), is modulated on a fixed frequency (sub-carrier 35 as schematically indicated by the gray areas) that allows an easy modulation of the RF carrier, resulting in an easy recovery of the transmitted RF signal on the RF receiver side. This method is of particular importance for IR carriers frequencies higher than 100 kHz.

Making use of a fixed modulation frequency for the RF transmission allows the use of fixed-bandwidth transmitter and receiver. Such a receiver and transmitter can then be optimized to overcome the disadvantages as mentioned above.

On the RF receiver side the two messages, header (carrier info) and data (envelope), are brought together again to reconstruct the original IR message.

Figure 4:
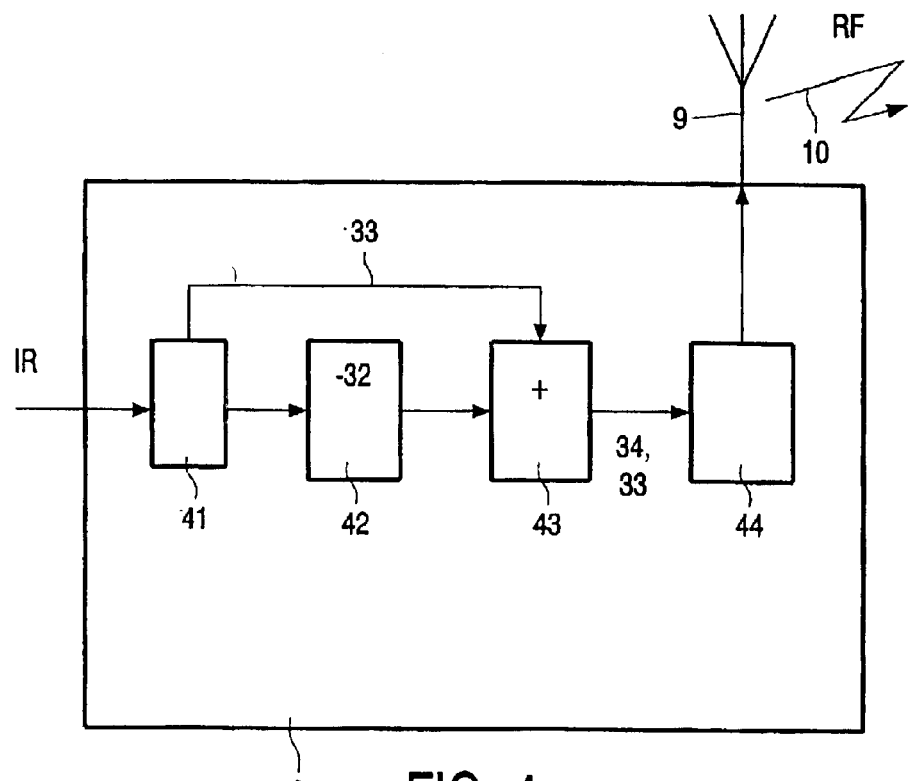

FIG. 4 schematically shows a detail of a system in accordance with an embodiment of the invention.

The signal generated by the IR receiver 7 upon receipt of IR signal 5 (in this Figure also denominated 'IR' for clarity) is sent to an IR sub-carrier detecting device 41 in which the IR sub-carrier is identified. This device generates a signal from which the IR sub-carrier can be deduced (in device 43). The signal is then demodulated in demodulator 42, leaving the envelope. The signal 33 is added to the demodulated signal in device 43, or alternatively, the device 43 itself generates the signal 33. This separate signal (hereinafter also called 'header' for simplicity) and envelope 34 are modulated with a fixed RF carrier in modulator 44. The signal is sent to antenna 9 and transmitted as RF signal 10.

Figure 5:
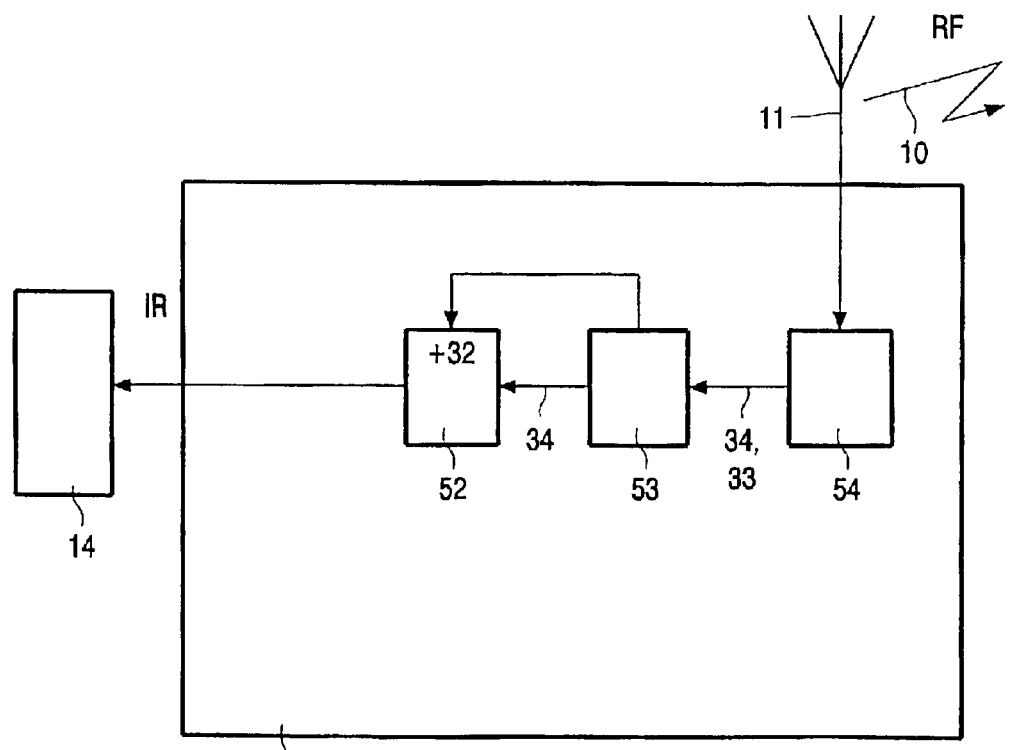

FIG. 5 schematically shows a further detail of a system in accordance with the invention. The RF signal is received by antenna 11 and sent to an RF demodulator 54, which generates signals 34 (the envelope) and 33 (the header). These signals are sent to a device which recognizes from the header 33 the IR sub-carrier and removes the header from the signal and sends the information on the IR sub-carrier to IR modulator 52, which modulates the envelope 34 with the IR sub-carrier to generate the IR signal, which is sent to IR transmitter for transmission. The required bandwidth of the RF signal is strongly reduced, which allows a better signal-to-noise ratio reduction and allows for a better recognition of the original signal and better noise resistance. Also this system can be used for an IR sub-carrier.

It is observed that the elements shown in these Figures may represent hardware components, such as separate or integrated circuits, as well as software components such as programs or parts of programs or any combination of hardware and software components suitable for performing the indicated function.

Figure 6:
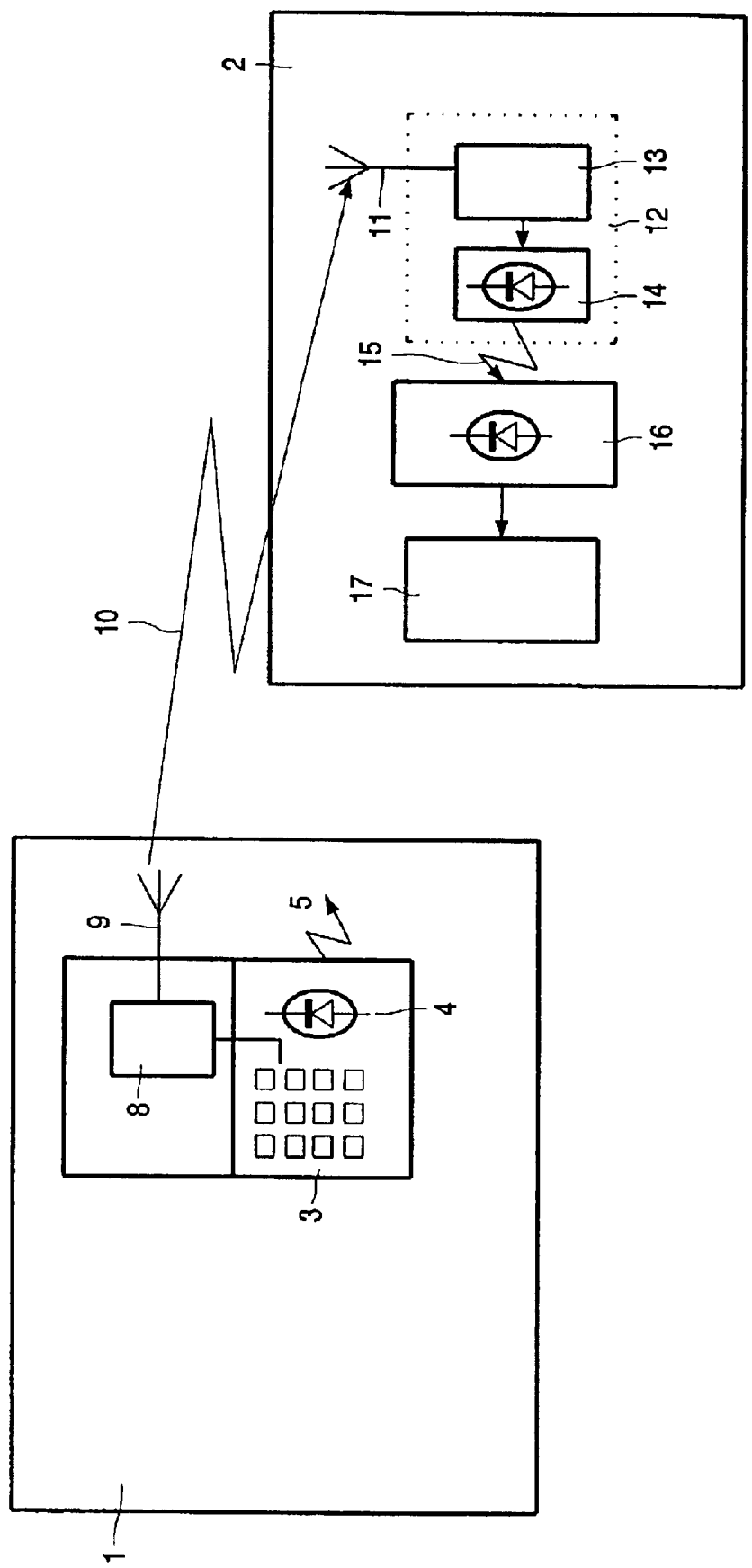

FIG. 6 also schematically illustrates an embodiment of the method and system in accordance with the invention.

The examples of the invention illustrated in the previous Figures relate to embodiments in which the starting signal is generated by an IR remote control unit 3.

Figure 7:
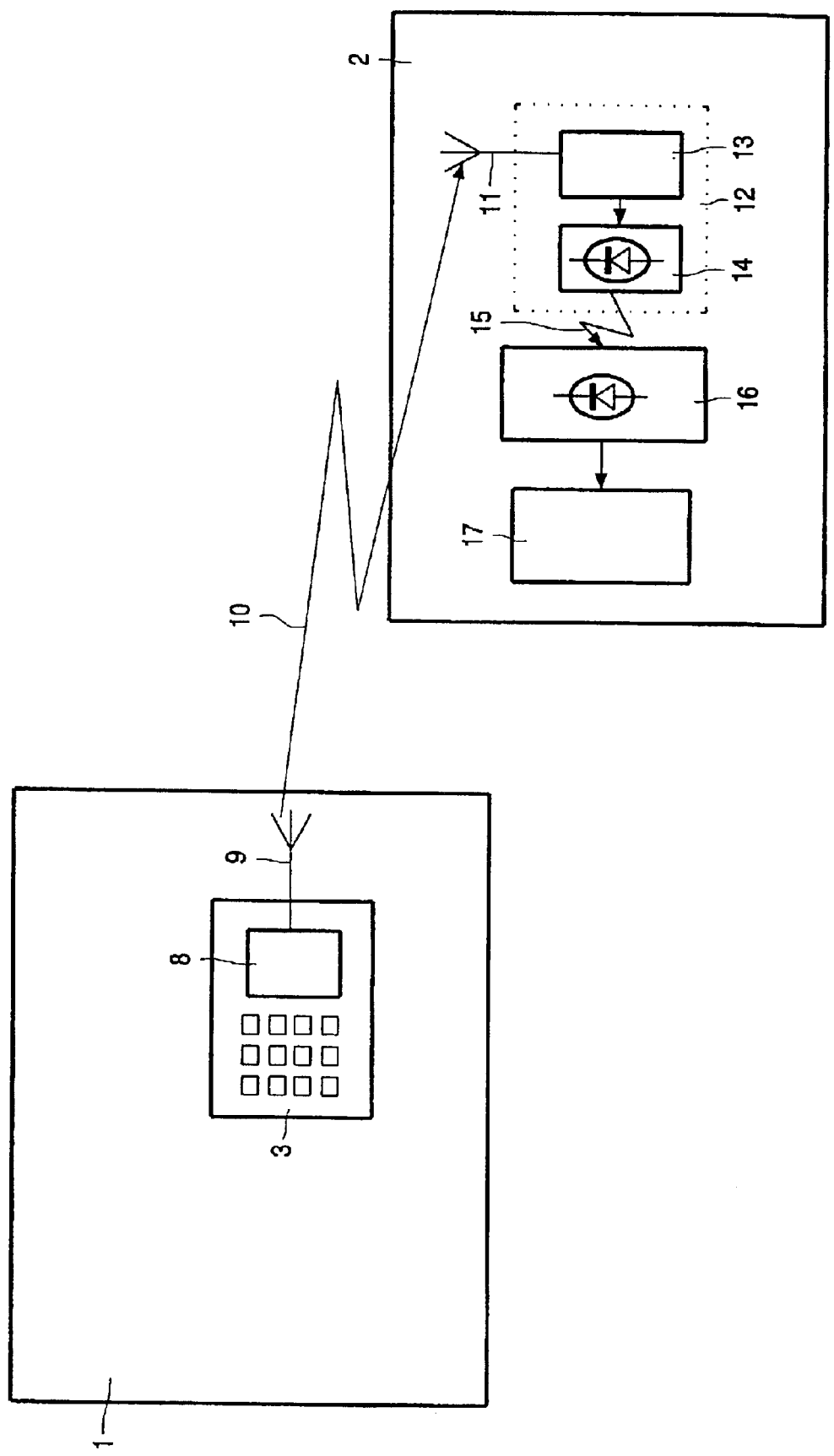

The invention is, however, also applicable in systems in which direct use is made of an RF signal. An example of such a system is schematically illustrated in FIG. 7. In this system a remote control unit is used which comprises both an IR transmitter and an antenna for transmission of RF signals. In this case the user taps a key, the CPU (Central processing unit) inside the remote control determines which code (corresponding to the tapped key) needs transmitting (by IR or RF) and fetches the required data from its memory which comprises a data base or other means in which tapped codes are linked to data to be transmitted. The RF transmitter is initialized and transmission is started, making sure that the 'envelope' signal and the 'sub-carrier' signal are separate signals, the sub-carrier signal preferably being transmitted as a header signal. Simultaneously, or independently thereof, an IR signal may be transmitted. Such systems will always operate, either directly via the IR signal, or via the RF signal. Neither is it necessary to deduce the sub-carrier from the IR signal, but this will be clear from the tapped code.

In FIG. 7 a system and method is illustrated in which the remote control sends an RF signal only. Again the RF signal comprises an 'envelope signal' (as, for instance, signal 34) and a sub-carrier signal (as, for instance, signal 33). In this case the remote control is of a simple design than in FIG. 6. In this embodiment the remote control unit comprises the radio transmitter 8.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements. 'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements.

It is observed for instance, that using the inventive method and system many IR signals can be accommodated. In the above examples the IR signals have a sub-carrier frequency which typically ranges from 20 kHz to 100 kHz and higher. IR signals can also be without an IR sub-carrier. In general there are a number of different IR code types including types without a carrier, called DC codes, and flash codes, where DC codes have long ON times and flash codes have short ON times. The sub-carrier frequency is then zero and the separate (preferably header) sub-carrier signal 34 will then contain the information that the carrier has zero frequency and the envelope is the whole signal. The great strength of the invention is the fact that no matter what the sub-carrier frequency (including a zero sub-carrier frequency) the method and system are able to transmit the information via RF so that the IR signal is more readily retrievable from the RF signal. Putting the sub-carrier information in a header, i.e. in advance of the envelope, has the advantage that at the receiving end the sub-carrier frequency is known prior to the reception of the envelope, which could be used to advantage for instance by tuning the receiver and/or IR transmitter to the known frequency and filtering other frequencies.

In short the invention can be described in that the principle is that the sub-carrier information of the IR signal is transmitted in the RF signal in a signal separate from the envelope information of the IR signal which is contained in an envelope signal.

What is claimed is:

1. A method of operating a remote control system comprising an RF transmission and receiving system (6, 12) which comprises a radio transmitter (8) for transmitting an RF signal (10) and a radio receiver (13) for receiving the RF signal (10) transmitted by the radio transmitter (8), said receiver being coupled to an infrared transmitter (14) for transmitting an IR signal (15) on an IR sub-carrier in response to the receipt of said RF signal (10), characterized in that the RF signal as sent comprises an envelope signal (34) containing information on the envelope of the IR signal and a sub-carrier signal (33) separate from the envelope signal containing information about the sub-carrier of the IR signal.

2. A method as claimed in claim 1, characterized in that the sub-carrier signal (33) is sent as a header message in front of the envelope signal (34).

3. A method as claimed in claim 1, characterized in that the IR sub-carrier has a frequency higher than 100 kHz.

4. A method as claimed in claim 1, characterized in that the IR sub-carrier has a zero frequency.

5. A method as claimed in claim 1, characterized in that the remote control system comprises an infrared remote control unit (3) with an infrared transmitter (4) for transmitting an IR signal (5) on an IR sub-carrier and the RF transmission and receiving system (6, 12) comprises an infrared receiver (7) for receiving the IR signal sent by the infrared remote control unit, the infrared receiver (7) being coupled to the radio transmitter (8).

6. A remote control system comprising an RF transmission and receiving system (6, 12) comprising a radio transmitter (8) for transmitting an RF signal (10), a radio receiver (13) for receiving an RF signal (10) transmitted by the radio receiver which is coupled to an infrared transmitter (14) for transmitting an IR signal on an IR sub-carrier in response to the receipt of said RF signal, characterized in that the RF transmission and receiving system comprises means for providing the RF signal with an envelope signal (34) containing information on the envelope of the IR signal and a sub-carrier signal (33) separate from the envelope signal containing information about the sub-carrier of the IR signal.

7. Remote control system as claimed in claim 6, characterized in that the remote control system comprises an infrared remote control unit (3) with an infrared transmitter (4) for transmitting an IR signal (5) on an IR sub-carrier, and the RF transmission and receiving system (6, 12) comprises an infrared receiver (7) for receiving the IR signal sent by the infrared remote control unit, the infrared receiver (7) being coupled to the radio transmitter (8).

8. A remote control system as claimed in claim 6, characterized in that the remote control system comprises a remote control unit which comprises both an infrared transmitter for transmitting an IR signal and the radio transmitter for transmitting the RF signal.

9. A remote control system as claimed in claim 6, characterized in that the remote control system comprises a remote control unit comprising the radio transmitter for transmitting the RF signal.

10. A radio transmitter (8) for transmitting an RF signal (10), comprising an infrared receiver (7) for receiving an IR signal (5) on an IR sub-carrier, characterized in that the radio transmitter comprises means for providing the RF signal with an envelope signal (34) containing information on the envelope of the IR signal and a sub-carrier signal (33) separate from the envelope signal containing information about the sub-carrier of the IR signal.

11. A radio receiver (13) for receiving an RF signal (10), said receiver being coupled to an infrared transmitter (14) for transmitting an IR signal on an IR sub-carrier in response to the receipt of said RF signal, characterized in that the radio receiver comprises means for decoding from the RF signal an envelope signal (34) containing information on the envelope of the IR signal and a sub-carrier signal (33) separate from the envelope signal containing information about the sub-carrier of the IR signal, and for transmitting the IR signal in accordance with said sub-carrier signal.

* * * * *